United States Patent
Cressman (10) Patent No.: US 12,553,791 B2
(45) Date of Patent: Feb. 17, 2026

(54) OFFBOARD MONITORING SYSTEM

(71) Applicant: Joy Global Underground Mining LLC, Warrendale, PA (US)

(72) Inventor: Toby J. Cressman, Titusville, PA (US)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 236 days.

(21) Appl. No.: 18/351,060

(22) Filed: Jul. 12, 2023

(65) Prior Publication Data
US 2024/0019339 A1      Jan. 18, 2024

Related U.S. Application Data

(60) Provisional application No. 63/388,454, filed on Jul. 12, 2022.

(51) Int. Cl.
G01M 5/00 (2006.01)
G05D 1/00 (2006.01)

(52) U.S. Cl.
CPC ........ *G01M 5/0075* (2013.01); *G01M 5/0033* (2013.01); *G05D 1/0094* (2013.01)

(58) Field of Classification Search
CPC . G01M 5/0075; G01M 5/0033; G05D 1/0094
USPC .......................................................... 701/2
See application file for complete search history.

(56) References Cited

U.S. PATENT DOCUMENTS

| | | | |
|---|---|---|---|
| 10,279,930 B2 | 5/2019 | Hukkeri et al. | |
| 10,452,078 B2 | 10/2019 | Zhao et al. | |
| 10,777,004 B2 | 9/2020 | Gray et al. | |
| 2001/0037888 A1 | 11/2001 | Akamatsu et al. | |
| 2010/0094676 A1 | 4/2010 | Perra et al. | |
| 2012/0294676 A1 | 11/2012 | Lill | |
| 2015/0100461 A1 | 4/2015 | Baryakar et al. | |
| 2015/0310674 A1 | 10/2015 | Humphrey et al. | |
| 2017/0329307 A1* | 11/2017 | Castillo-Effen | G05B 19/4065 |
| 2020/0039076 A1 | 2/2020 | Subrahmaniyan et al. | |
| 2021/0000013 A1* | 1/2021 | Robertson | B25J 15/0019 |

(Continued)

FOREIGN PATENT DOCUMENTS

| | | |
|---|---|---|
| CN | 113043285 A | 6/2021 |
| WO | 2020134187 A1 | 7/2020 |
| WO | 2021052645 A1 | 3/2021 |

OTHER PUBLICATIONS

GB2310629.7 Combined Search and Examination Reported dated Jan. 2, 2024 (5 pages).

*Primary Examiner* — Mahmoud S Ismail
(74) *Attorney, Agent, or Firm* — Husch Blackwell LLP (57) ABSTRACT

A system and method for offboard monitoring are provided. The system may include a remote monitoring vehicle including one or more sensors, a drive mechanism for driving the remote monitoring vehicle; and a controller coupled to the one or more sensors and the drive mechanism. The controller may be configured to navigate the monitoring vehicle along a predetermined path of the industrial site; receive sensor data relating to an equipment; determine a state of the equipment based on the sensor data; determine whether the state of the equipment meets a threshold state for maintenance; and generate an alert indicating a maintenance event for the equipment when the state of the equipment meets the threshold state for maintenance.

22 Claims, 6 Drawing Sheets

(56) References Cited

U.S. PATENT DOCUMENTS

2021/0261251 A1\* 8/2021 Claybrough .............. B64F 5/00
2021/0299880 A1\* 9/2021 Cupersmith ......... B25J 11/0005

\* cited by examiner

OFFBOARD MONITORING SYSTEM

CROSS-REFERENCE TO RELATED APPLICATION

This application claims the benefit of the filing date of U.S. Provisional Application Ser. No. 63/388,454 filed Jul. 12, 2022, which is hereby incorporated by reference as if fully set forth herein.

TECHNICAL FIELD

This disclosure relates to an offboard monitoring system. More particularly, this disclosure relates to an offboard monitoring system that can be used in mining environments.

BACKGROUND

Mining sites can be very large and dangerous. Mining sites also have a wide variety of equipment that need to be monitored to ensure that they are working correctly. Typically, monitoring of equipment is performed by onboard sensors on the equipment and/or by personnel inspecting the equipment. However, sending personnel into the mining sites for routine monitoring and maintenance may not always be feasible or safe.

SUMMARY

Accordingly, there is a need for an offboard monitoring system that allows an operator to gain information on the equipment from a safe distance and in a way that does not interfere with the mining process. The remote monitoring system can act as the eyes and ears of the operator to help determine failures, assist in remote operation, and from the sensors, provide input into the control system to enable automation features.

In one independent aspect, a remote monitoring vehicle for an industrial site includes one or more sensors; a drive mechanism for driving the remote monitoring vehicle; and a controller coupled to the one or more sensors and the drive mechanism. The controller is configured to: navigate, using the drive mechanism, the monitoring vehicle along a predetermined path of the industrial site; receive, from the one or more sensors, sensor data relating to an equipment; determine a state of the equipment based on the sensor data; determine whether the state of the equipment meets a threshold state for maintenance; and generate an alert indicating a maintenance event for the equipment when the state of the equipment meets the threshold state for maintenance.

In some aspects, the remote monitoring vehicle further includes a first extension arm coupled to the controller, wherein the first extension arm is further coupled to a first attachment.

In some aspects, the remote monitoring vehicle further includes a second includes arm coupled to the controller, wherein the second extension arm is further coupled to a second attachment.

In some aspects, the first attachment is different from the second attachment.

In some aspects, the first attachment and the second are each a pick removing tool or a grabber assembly.

In some aspects, the drive mechanism includes one or more propellers.

In some aspects, the one or more sensors are each a microphone, an imaging device, a thermal imaging device, or a vibration sensor.

In some aspects, the pick bin is provided within a proximity of the first extension arm such that the first extension arm can access a content of the pick bin.

In some aspects, the controller is further configured to correlate a position of the first extension arm with a position of a bit block of the equipment having a worn cutting pick; remove, using the first extension arm, the worn cutting pick from the bit block; grab, using the first extension arm, a new cutting pick from the pick bin; and place, using the first extension arm, the new cutting pick on the bit block.

In some aspects, the controller is further configured to identify a cable of the equipment to be moved; secure, using the first extension arm, the cable to the remote monitoring vehicle; navigate, using the drive mechanism, the remote monitoring vehicle to a desired location; and place, using the first extension arm, the cable at the desired location.

In another independent aspect, a method for offboard monitoring of an industrial site using a remote monitoring vehicle, the method includes navigating, using a controller, a remote monitoring vehicle along a predetermined path of the industrial site; receiving, using the controller, sensor data relating to an equipment from one or more sensors of the remote monitoring vehicle; determining, using the controller, a state of the equipment based on the sensor data; determining, using the controller, whether the state of the equipment meets a threshold state for maintenance; and generating, using the controller, an alert indicating a maintenance event for the equipment when the state of the equipment meets the threshold state for maintenance.

In some aspects, the method further includes correlating, using the controller, a position of an extension arm of the remote monitoring vehicle with a position of a bit block of the equipment having a worn cutting pick; removing, using the extension arm of the remote monitoring vehicle, the worn cutting pick from the bit block; grabbing, using the extension arm, a new cutting pick from a pick bin; and placing, using the extension arm, the new cutting pick on the bit block.

In some aspects, the method of further includes identifying, using the controller, a cable of the equipment to be moved; securing, using an extension arm of the remote monitoring vehicle, the cable to the remote monitoring vehicle; navigating, using the controller, the remote monitoring vehicle to a desired location; and placing, using the extension arm, the cable at the desired location.

In some aspects, the receiving, using the controller, the sensor data relating to the equipment further comprises receiving sensor data from different types of sensors.

In some aspects, the receiving sensor data relating to an equipment comprises receiving a first sensor data from a first sensor of the remote monitoring vehicle and a second sensor data from a second sensor of the remote monitoring vehicle, wherein the determining the state of the equipment comprises determining a first state of the equipment based on the first sensor data and determining a second state of the equipment based on the second sensor data, determining whether the state of the equipment meets the threshold state for maintenance comprises determining whether the first state of the equipment meets a first threshold state for maintenance and whether the second state of equipment meets a second threshold state for maintenance, and wherein the first sensor is a different type of sensor than the second sensor.

In some aspects, the generating the alert indicating the maintenance event for the equipment comprises only generating the alert when both the first state of the equipment meets the first threshold state for maintenance and the second state of the equipment meets the second threshold state for maintenance.

In yet another independent aspect, a system for remote monitoring for an industrial site includes an equipment; and a remote monitoring vehicle for monitoring the equipment, the remote monitoring vehicle includes one or more sensors; a drive mechanism for driving the remote monitoring vehicle; and a controller coupled to the one or more sensors and the drive mechanism; the controller is configured to: navigate, using the drive mechanism, the monitoring vehicle along a predetermined path of the industrial site; receive, from the one or more sensors, sensor data relating to the equipment; determine a state of the equipment based on the sensor data; determine whether the state of the equipment meets a threshold state for maintenance; and generate an alert indicating a maintenance event for the equipment when the state of the equipment meets the threshold state for maintenance.

In some aspects, the remote monitoring vehicle further includes a first extension arm coupled to the controller, wherein the first extension arm is further coupled to a first attachment.

In some aspects, the remote monitoring vehicle further includes a second extension arm coupled to the controller, wherein the second extension arm is further coupled to a second attachment.

In some aspects, the first attachment is different from the second attachment.

In some aspects, the first attachment and the second are each a pick removing tool or a grabber assembly.

In some aspects, the drive mechanism includes one or more propellers.

In some aspects, the one or more sensors are each a microphone, an imaging device, a thermal imaging device, or a vibration sensor.

In some aspects, the remote monitoring vehicle further includes a pick bin, wherein the pick bin is provided within a proximity of the first extension arm such that the first extension arm can access a content of the pick bin.

In still another independent aspect, a remote monitoring vehicle for an industrial site includes one or more extension arms; a drive mechanism for driving the remote monitoring vehicle; and a controller coupled to the plurality of sensors, the one or more extension arms, and the drive mechanism. The controller is configured to: navigate, using the drive mechanism, the remote monitoring vehicle to an equipment; correlate a position of the one or more extension arms with a position of a bit block of the equipment having a worn cutting pick; remove, using the one or more extension arms, the worn cutting pick from the bit block; grab, using the one or more extension arms, a new cutting pick from a pick bin; and place, using the one or more extension arms, the new cutting pick on the bit block.

In still another independent aspect, a method for replacing a worn cutting pick on an equipment using a remote monitoring vehicle includes: navigating, using a controller of the remote monitoring vehicle, the remote monitoring vehicle to an equipment; correlating, using the controller, a position of one or more extension arms of the remote monitoring vehicle with a position of a bit block of the equipment having the worn cutting pick; removing, using one or more extension arms of the remote monitoring vehicle, the worn cutting pick from the bit block; grabbing, using the one or more extension arms, a new cutting pick from a pick bin; and placing, using the one or more extension arms, the new cutting pick on the bit block.

In still another independent aspect, a remote monitoring vehicle for an industrial site includes: one or more extension arms; a drive mechanism for driving the remote monitoring vehicle; and a controller coupled to the plurality of sensors, the one or more extension arms, and the drive mechanism. The controller is configured to: navigate, using the drive mechanism, the remote monitoring vehicle to an equipment; identify a cable of the equipment to be moved; secure, using the one or more extension arms, the cable to the remote monitoring vehicle; navigate, using the drive mechanism, the remote monitoring vehicle to a desired location; and place, using the one or more extension arms, the cable in the desired location.

In still another independent aspect, a method for moving cables of an equipment using a remote monitoring vehicle includes: navigating, using a controller of the remote monitoring vehicle, the remote monitoring vehicle to an equipment; identifying, using the controller, a cable of the equipment to be moved; securing, using one or more extension arms of the remote monitoring vehicle, the cable to the remote monitoring vehicle; navigating, using the controller, the remote monitoring vehicle to a desired location; and placing, using the one or more extension arms, the cable in the desired location.

Before explaining the disclosed embodiment of this disclosure in detail, it is to be understood that the disclosure is not limited in its application to the details of the particular arrangement shown, since the disclosure is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Embodiments are also described as methods. However, it is to be understood that all blocks of the method may be optional unless otherwise noted. For example, some blocks of the method may be skipped or altered without deviating from this disclosure. The blocks of the methods may be performed in any order including the order listed in the methods. Embodiments are illustrated with the help of example figures and related descriptions. The devices, systems, and methods described herein may include more or fewer components than illustrated and described and may perform functions other than those listed herein without deviating from the disclosure.

Figure 1:
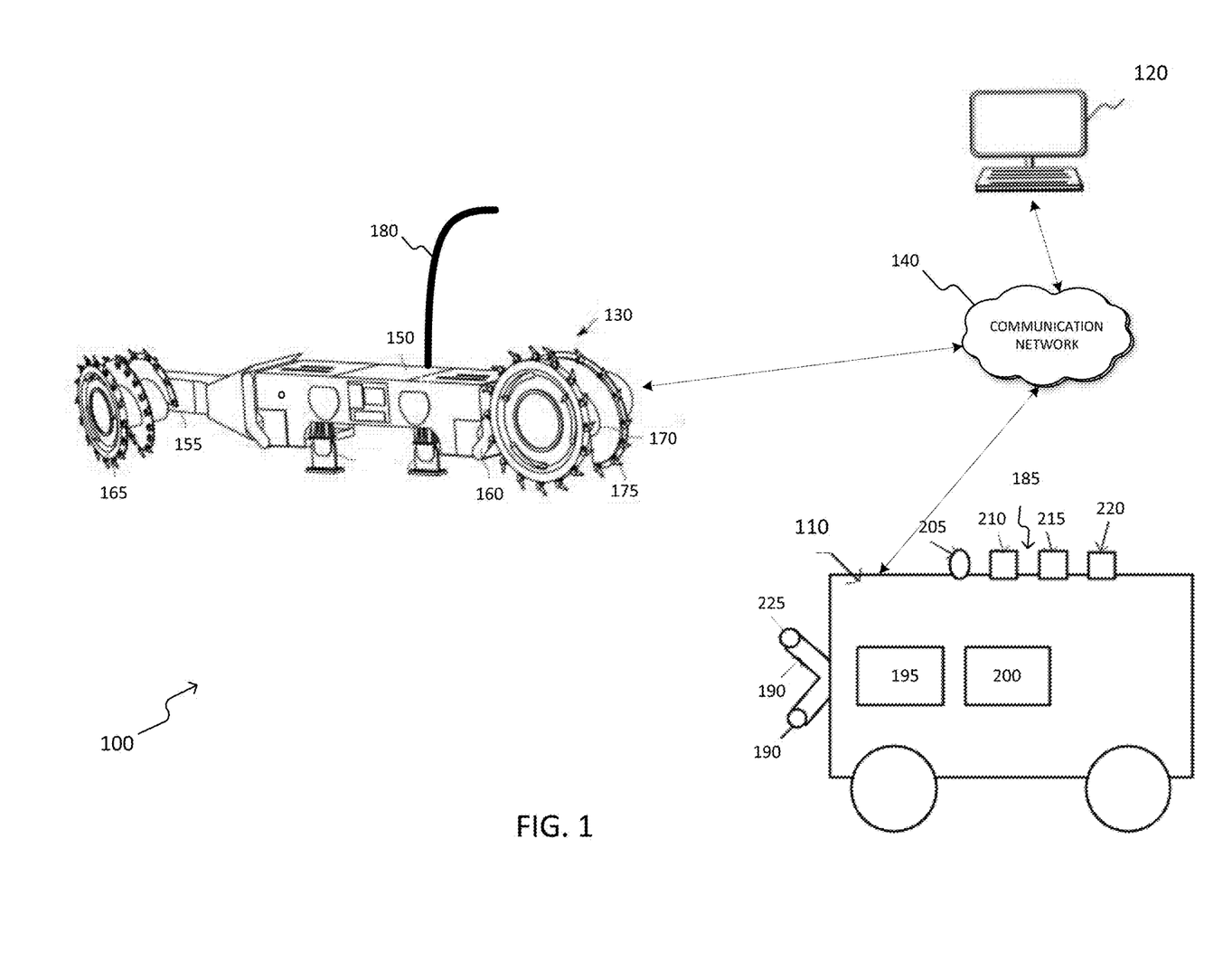
FIG. 1 illustrates a system diagram of a diagram of an offboard monitoring system in accordance with some embodiments.

FIG. 1 illustrates an embodiment of an offboard monitoring system 100. The offboard monitoring system 100 may be used in large industrial environments, for example, an underground mining site, a surface mining site, or the like, to remotely monitor and perform maintenance on various equipment at the industrial site.

In the example illustrated, the offboard monitoring system 100 may include a monitoring vehicle 110, a remote monitoring server 120, and one or more equipment 130 communicating over a communication network 140. The monitoring vehicle 110 may move around the industrial site to monitor equipment 130. The remote monitoring server 120 may, for example, be a surface computer (such as a desktop computer), a tablet computer, or the like. The equipment 130 may include mining machines and/or mining equipment, for example, longwall shearers, continuous miners, armored face conveyors, beam stage loaders, flexible conveyor trains, shuttle cars, battery haulers, scoops, maingate equipment, tailgate equipment, hydraulic roof supports, drill rigs, bolters, and/or the like.

In the example illustrated, the equipment 130 may be a longwall shearer configured to extract a material (for example, coal or other ores) from a mine. The equipment 130 may include an elongated central housing 150 (for example, a shearer housing). A right ranging arm 155 and a left ranging arm 160 may respectively extend laterally from the housing 150. The right ranging arm 115 and the left ranging arm 160 may be raised and lowered by hydraulic cylinders attached to the ranging arms 155, 160 and housing 150.

A right cutting drum 165 may be provided on the distal end of the right ranging arm 155 (with respect to the housing 150), and a left cutting drum 170 may be provided on the distal end of the left ranging arm 160. Each cutting drum 165, 170 may be driven by an electric motor (not shown) via a gear train within the ranging arm 155, 160. Each of the cutting drums 165, 170 may include a plurality of cutting picks 175 that abrade a material face as the cutting drums 165, 170 are rotated, thereby cutting away the material. The equipment 130 may include one or more cables 180 that attach the equipment 130 to a power source or other equipment.

The monitoring vehicle 110 may be a ground vehicle, as illustrated, or an aerial vehicle (for example, a drone). In the illustrated example, the monitoring vehicle 110 may include a plurality of sensors 185, one or more extension arms 190 (singularly referred to as an extension arm 190), a pick bin 195, and a drive mechanism 200. The plurality of sensors 185, the extension arm 190, and the pick bin 195 may be arranged on and around the body of the monitoring vehicle 110. The plurality of sensors 185 may include, for example, a microphone 205, an imaging device 210, a thermal imaging device 215, a vibration sensor 220, and/or the like. The extension arm 190 may be a powered arm such as an electrically powered arm, a hydraulic powered arm, a pneumatic powered arm, or the like that can move about the body of the monitoring vehicle 110.

The extension arm 190 may include one or more attachments 225 (such as a pick removing tool, a grabber assembly, or the like). The attachment 225 may be provided on the distal end of the extension arm 190. The attachment 225 may be configured to engage with components of the equipment 130 (for example, picks 175, cables 180, or the like). For example, a pick removing tool may be used to remove picks 175 from a cutting machine and a grabber tool may be used to grab and place new picks 175 on the cutting machine. The pick bin 195 may be provided within a proximity (for example, within an accessible range) of the extension arm 190 such that the extension arm 190 can access the contents of the pick bin 195. The pick bin 195 may store replacements components, tools, and the like that are used for performing monitoring and maintenance tasks on the equipment 130. The pick bin 195 may be organized into different sections.

The drive mechanism 200 may include one or more drive motors (not shown) and is configured to move the monitoring vehicle 110 across the industrial site. The drive mechanism 200 may also include a plurality of wheels or propellers configured to move the monitoring vehicle 110 across the industrial site.

The communication network 140 may be a wired or wireless network that facilitates communication between the monitoring vehicle 110, the remote monitoring server 120, and the plurality of equipment 130. The communication network 140 may include a local area network, for example, a Bluetooth® network, a Wi-Fi® network, or the like, or may include a wide area network, for example, a cellular network, the Internet, or the like. In some embodiments, the communication network 140 is a dedicated wireless network for the industrial environment, for example, a private long-term evolution (LTE) network, a leaky feeder network, or the like set up for the industrial site.

Figure 2:
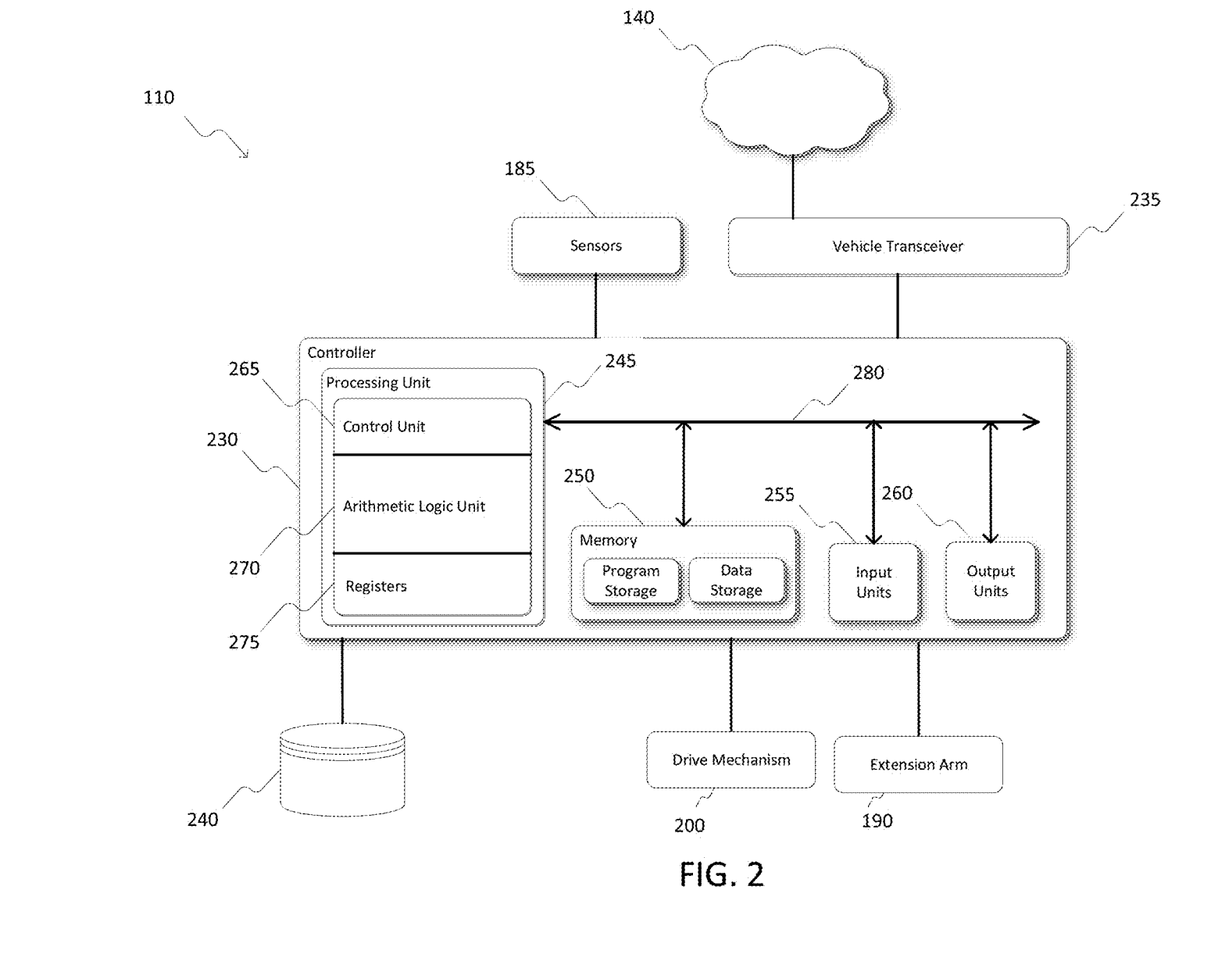
FIG. 2 illustrates a block diagram of an industrial equipment in accordance with some embodiments.

FIG. 2 illustrates a simplified block diagram of the monitoring vehicle 110. In the illustrated example, the monitoring vehicle 110 may include a controller 230 electrically and/or communicatively connected to a variety of modules or components of the monitoring vehicle 110 and the offboard monitoring system 100. For example, the controller 230 may be connected to a vehicle transceiver 235, the plurality of sensors 185, a database 240 (for example, for storing images and/or video related to the mining equipment, component profiles, etc.), the drive mechanism 200, and the extension arm 190 of the monitoring vehicle 110.

The controller 230 may include combinations of hardware and software that are operable to, among other things, control the operation of the monitoring vehicle 110 using the drive mechanism 200, control operation of the extension arm 190, communicate with the remote monitoring server 120, receive and analyze data from the plurality of sensors 185, among other functions. In some embodiments, the controller 230 may include a plurality of electrical and electronic components that provide power, operational control, and protection to the components and modules within the controller 230 and/or monitoring vehicle 110. For example, the controller 230 may include, among other things, a processing unit 245 (e.g., a microprocessor, a microcontroller, an electronic processor, or another suitable programmable device), a memory 250, input units 255, and output units 260. The processing unit 245 may include, among other things, a control unit 265, an arithmetic logic unit ("ALU") 270, and a plurality of registers 275 (shown as a group of registers in FIG. 2), and may be implemented using a known computer architecture (e.g., a modified Harvard architecture, a von Neumann architecture, etc.). The processing unit 245, the memory 250, the input units 255, and the output units 260, as well as the various modules connected to the controller 230 may be connected by one or more control and/or data buses (e.g., a common bus 280). The control and/or data buses are shown generally in FIG. 2 for illustrative purposes.

The memory 250 may be in the form of a non-transitory computer-readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 245 may be connected to the memory 250 and executes software instructions that are capable of being stored in a RAM of the memory 250 (e.g., during execution), a ROM of the memory 250 (e.g., on a generally permanent basis), or another non-transitory computer-readable medium such as another memory or a disc. Software included in the implementation of the monitoring vehicle 110 may be stored in the memory 250 of the controller 230. The software may include, for example, firmware, one or more applications, program data, filters, rules, one or more program modules, image processing software, and other executable instructions. The controller 230 retrieves from the memory 250 and executes, among other things, instructions related to the control processes and methods described herein. In other constructions, the controller 230 includes additional, fewer, or different components than those described herein.

The database 240 may be configured to store sensor data, for example, audio data captured by the microphone 205, image or video data captured by the imaging device 210, thermal imaging data captured by the thermal imaging device 215, vibration data captured by the vibration sensor 220, and/or the like. The controller 230 may receive the data from the corresponding sensor 185 and write the data to the database 240. The drive mechanism 200 may include an engine, one or more motors, one or more propellers, and/or the like that are controlled by the controller 230 to move the monitoring vehicle 110 around the industrial site. The drive mechanism 200 may also control the movement of the extension arm 190.

The vehicle transceiver 235 may facilitate wired and/or wireless communication between the monitoring vehicle 110 and other devices (for example, the remote monitoring server 120, the equipment 130, or the like) over the communication network 140. In some embodiments, the vehicle transceiver 235 may include separate transmitting and receiving components.

Figure 3:
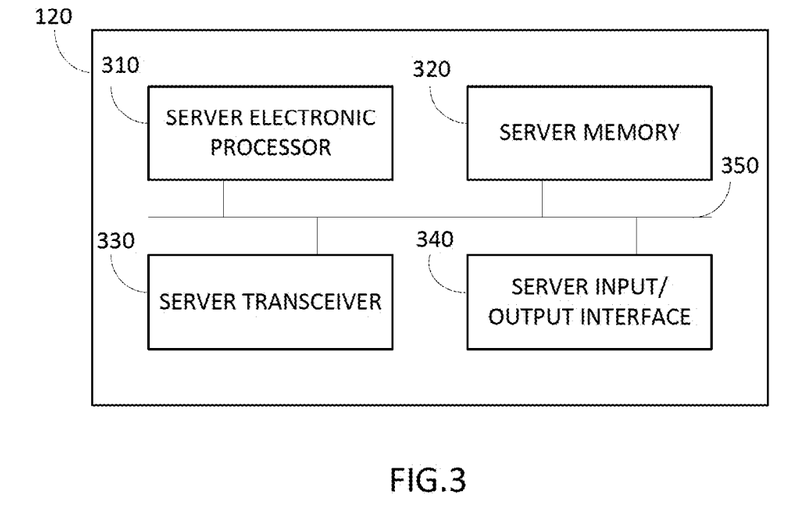
FIG. 3 illustrates a block diagram of a remote monitoring sever of the offboard monitoring system of FIG. 1 in accordance with some embodiments.

With reference to FIG. 3, the remote monitoring server 120 may include a server electronic processor 310, a server memory 320, a server transceiver 330, and a server input/output interface 340. The server electronic processor 310, the server memory 320, the server transceiver 330, and the server input/output interface 340 as well as other various modules (not shown) may be communicatively coupled to each other via one or more control and/or data buses (for example, a server communication bus 350). The server electronic processor 310 and the server memory 320 may be implemented similar to the controller 230 and corresponding memory 250. The server transceiver 330 may be implemented similar to the vehicle transceiver 235. The server transceiver 330 facilitates communication between the remote monitoring server 120 and other components (for example, the monitoring vehicle 110, the equipment 130, and the like) over the communication network 140. The server input/output interface 340 may include one or more input components (for example, a keyboard, a mouse, or the like), one or more output components (for example, a display, speakers, or the like), or a combined input/output component (for example, a touch screen display).

Figure 4:
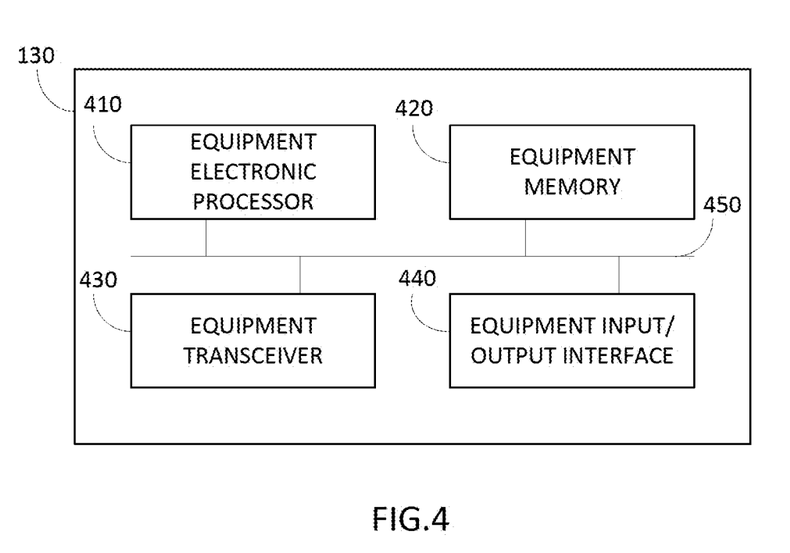
FIG. 4 illustrates a block diagram of the monitoring vehicle of FIG. 1 in accordance with some embodiments.

With reference to FIG. 4, the equipment 130 may include an equipment electronic processor 410, an equipment memory 420, an equipment transceiver 430, and an equipment input/output interface 440. The equipment electronic processor 410, the equipment memory 420, the equipment transceiver 430, and the equipment input/output interface 440 as well as other various modules (not shown) are communicatively coupled to each other via one or more control and/or data buses (for example, an equipment communication bus 450). The equipment electronic processor 410 and the equipment memory 420 may be implemented similar to the controller 230 and corresponding memory 250. The equipment transceiver 430 may be implemented similar to the vehicle transceiver 235. The equipment transceiver 430 facilitates communication between the equipment 130 and other components (for example, the monitoring vehicle 110, the remote monitoring server 120, and the like) over the communication network 140. The equipment input/output interface 440 may include one or more input components (for example, a keyboard, a mouse, or the like), one or more output components (for example, a display, speakers, or the like), or a combined input/output component (for example, a touch screen display).

Figure 5:
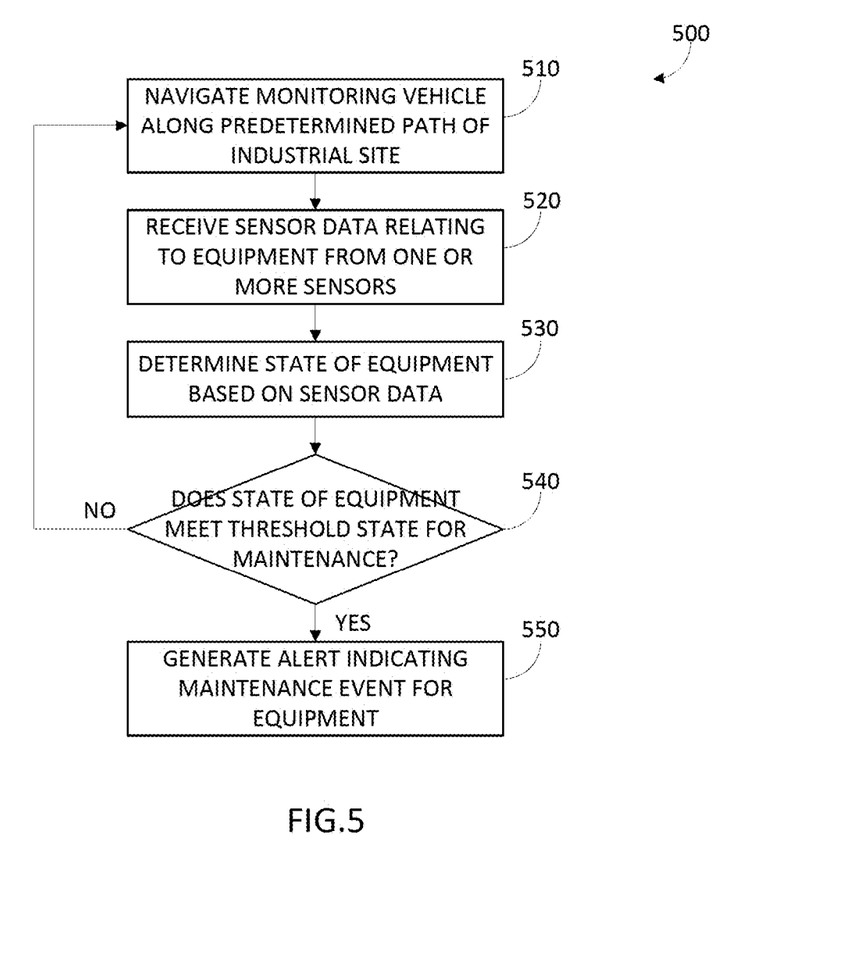
FIG. 5 illustrates a flowchart of a method for monitoring equipment using the monitoring vehicle of FIG. 1 in accordance with some embodiments.

FIG. 5 illustrates a flowchart of a method 500 for monitoring equipment 130 using the monitoring vehicle 110 according to some embodiments. The method 500 may be implemented using the controller 230 or the server electronic processor 310.

At step 510, the monitoring vehicle 110 may navigate, using the controller 230, along a predetermined path of the industrial site. The monitoring vehicle 110 may move autonomously or semi-autonomously around the industrial site. The monitoring vehicle 110 may include one or more positioning sensors (for example, a global positioning sensor, or the like) configured to determine an actual or relative position of the monitoring vehicle 110. Predetermined paths of the industrial site may be loaded into the monitoring vehicle 110 such that the monitoring vehicle 110 may travel along the predetermined paths and performs various monitoring tasks along the predetermined path. The monitoring tasks may include, for example, capturing images or information relating to equipment 130, monitoring wear and tear of components of the equipment 130, replacing worn components of the equipment 130, or the like.

In other embodiments, the monitoring vehicle 110 may be remotely controlled using the remote monitoring server 120 to move around the industrial site. In these embodiments, an operator may control the monitoring vehicle 110 to move around the industrial site and perform various monitoring tasks. The controller 230 may control the drive mechanism 200 to move the monitoring vehicle 110 along the paths.

At step 520, the method 500 may include receiving, using the controller 230, sensor data relating to an equipment 130 from one or more sensors 185. The monitoring vehicle 110 may approach equipment 130 and collect data relating to the equipment 130 using the plurality of sensor 185. The monitoring vehicle 110 may collect data from different vantage points and on different sides of the equipment 130. The locations of where data is collected may be predetermined in the predetermined travel plan or the operator may manually select where data should be taken using the remote monitoring server 120.

As discussed above, the monitoring vehicle 110 may include several sensors 185 for collecting data relating to an equipment 130. The sensors 185 may include the microphone 205, the imaging device 210, the thermal imaging device 215, the vibration sensor 220, and/or the like. The monitoring vehicle 110 may be equipped with one or more of each type of sensor 185 disposed at various locations on the monitoring vehicle 110 (for example, on the front side, rear side, top side, or bottom side). The sensors 185 may be configured to capture, for example, audio data, images, temperature or heat map data, vibration data, and the like of the equipment 130 before, during, and/or after operation of the equipment 130. Sensor data from the sensors 185 may help determine failure or maintenance event in a variety of equipment 130 and in components of the equipment 130. For example, the monitoring vehicle 110 may determine wear or failure in various components, for example, rollers, gearbox, bearings, motors, picks, filters, or the like based on the sensor data.

At step 530, the method 500 may include determining, using the controller 230, a state of the equipment 130 based on the sensor data. In some embodiments, the controller 230 may analyze the received sensor data to determine a state of the equipment 130. In other embodiments, the controller 230 may forward the raw or processed sensor data to the remote monitoring server 120. In these embodiments, the remote monitoring server 120 (for example, the server electronic processor 310) may analyze the sensor data to determine the state of the equipment 130. Analyzing the sensor data may include comparing the sensor data to known or stored data to determine the differences between the sensor data and the known or stored data. For example, audio data from the microphones 205, heat map data from the thermal imaging devices 215, and/or vibration data from the vibration sensors 220 may be compared to stored audio data, heat map data, and/or vibration data respectively of the equipment 130 or a component of the equipment 130. The controller 230 may determine a state of the equipment 130 based on the differences between the sensor data and the known or stored data. For example, the controller 230 may determine a wear level, deterioration, failure, or the like of a component based on the amount of difference between the sensor data and the known or stored data. The known or stored data may be collected during a normal operating condition or during an initial run (that is, the first run) of the equipment 130.

At step 540, the method 500 may include determining whether the state of the equipment 130 meets a threshold state for maintenance. The controller 230 may compare the state of the equipment 130, for example, a wear level, deterioration, or the like of a component of the equipment 130 to a threshold state. The threshold state may be selected to indicate that the equipment 130 may need maintenance, for example, repair, replacement, or the like of a component when the state of the equipment 130 meets the threshold state. In some embodiments, determining whether the state of the equipment 130 meets the threshold state may include determining whether the sensor data exceeds a sensor data threshold associated with the maintenance of the equipment 130. For example, a heat map data may be compared to a heat threshold for a component that indicates significant wear of the component. When the state of the equipment 130 does not meet the threshold state for maintenance, the monitoring vehicle 110 may move on to monitor a next component or next equipment 130.

At step 550, in response to determining that the state of the equipment 130 meets the threshold state for maintenance, the method 500 may include generating, using the controller 230, an alert indicating a maintenance event for the equipment 130. The alert may include an audio alert, a visual alert, a text alert, a notification, and/or the like. The alert may be generated by the controller 230 and provided on a user interface (for example, a display, speakers, or the like) of the monitoring vehicle 110. In some embodiments, the alert may be transmitted to the equipment 130 or the remote monitoring server 120. The alert may then be provided on a user interface of the equipment 130 or the remote monitoring server 120.

The method 500 may be used to detect various maintenance events of various equipment 130. For example, the method 500 may be used to detect dull cutting picks 175 of a cutting machine, failing roller and bearings of a flexible conveyor train, blocked filters of a hydraulic system, failing components of gear boxes, failing motors, and/or the like.

In one aspect, the method 500 may be used to identify dull cutting picks 175 of a cutting machine. The monitoring vehicle 110 is navigated around a predetermined path to a cutting machine (for example, a longwall shearer). One or more sensors 185 may be used to capture data relating to the cutting picks 175 of the cutting machine. In one example, the thermal imaging device 215 may be used to capture the heat signature of the cutting picks 175 of the cutting machine. Dull cutting picks 175 may generate more heat than new cutting picks 175. The heat signature of new cutting picks 175 during or after operation may have been previously acquired and stored in the database 240. The controller 230 may determine the state of the cutting picks 175 based on the heat signature of the cutting picks 175 received from the thermal imaging device 215. The controller 230 may compare the heat signature of the cutting picks 175 to heat signature data stored in the database 240 to determine the level of wear. When the level of wear is below a level at which replacement of the cutting picks 175 is desired (that is, threshold state for maintenance), the controller 230 may generate an alert indicating that the cutting pick(s) 175 need to be replaced on the cutting machine. In another example, the imaging device 210 may be used instead of or in addition to the thermal imaging device 215 to determine a maintenance event. The imaging device 210 may capture images of the cutting picks 175 of the cutting machine. Dull cutting picks 175 may have reduced height/length or altered geometry compared to new cutting picks 175. The controller 230 may determine the height/length or the geometry of the cutting picks 175 using the captured images to determine whether the cutting picks 175 need to be replaced. The controller 230 may compare the dimensions or geometry of the cutting picks 175 with a threshold to determine whether the cutting picks 175 need to be replaced.

In another aspect, the method 500 may be used to identify failed roller and/or bearings of a flexible conveyor train. The monitoring vehicle 110 may navigate around a predetermined path to a flexible conveyor train (for example, an armored face conveyor). One or more sensors 185 may be used to capture data relating to the rollers and/or bearings of the flexible conveyor train. In one example, the thermal imaging device 215 may be used to capture the heat signature of the rollers and/or bearings of the flexible conveyor train. The heat signature of functioning rollers and/or bearings during or after operation may have been previously acquired and stored in the database 240. The controller 230 may determine the state of the rollers and/or bearings based on the heat signature of the rollers and/or bearings received from the thermal imaging device 215. The controller 230 may compare the heat signature of the rollers and/or bearings to heat signature data stored in the database 240 to determine failure of the rollers and/or bearings. When the rollers and/or bearings of the flexible conveyor train have failed (that is, reached the threshold state for maintenance), the controller 230 may generate an alert indicating that the rollers and/or bearings need to be replaced on the flexible conveyor train. In another example, the microphone 205 may be used instead of or in addition to the thermal imaging device 215 to determine a maintenance event. The microphone 205 may captures sounds or audio data of the rollers and/or bearings of the flexible conveyor train. Failed rollers and/or bearings may produce excessive noise or may not generate any noise. In some embodiments, failed roller and/or bearing may produce noise at a different frequency or amplitude. The controller 230 may determine audio signature (for example, amplitude, frequency, dispersion, and/or the like) of the rollers and/or bearings to determine whether the rollers and/or bearings have failed. The controller 230 may compare the audio signature the rollers and/or bearings with a threshold or with previously stored audio signature data to determine whether the rollers and/or bearings need to be replaced.

In another aspect, the method 500 may be used to identify blocked filters in a hydraulic system. The monitoring vehicle 110 may navigate around a predetermined path to a hydraulic system (for example, longwall shearer arms, roof supports, etc.). One or more sensors 185 may be used to capture data relating to the filters of the hydraulic system. In one example, the thermal imaging device 215 may be used to capture the heat signature of the filters of the hydraulic system. Blocked filters may generate excessive heat compared to functioning filters. The heat signature of functioning filters during or after operation may have been previously acquired and stored in the database 240. The controller 230 may determine the state of the filters based on the heat signature of the filters received from the thermal imaging device 215. The controller 230 may compare the heat signature of the filters to a heat threshold or to heat signature data stored in the database 240 to determine whether the filter is blocked. When the filter is blocked (that is, threshold state for maintenance), the controller 230 may generate an alert indicating that the filters need to be replaced on the cutting machine.

In another aspect, the method 500 may be used to identify failed components of a gearbox. The monitoring vehicle 110 may navigate around a predetermined path to a mining machine (for example, a mining truck). One or more sensors 185 may be used to capture data relating to the gearbox components. In one example, the thermal imaging device 215 may be used to capture the heat signature of the gearbox components. The heat signature of functioning gearbox components during or after operation may have been previously acquired and stored in the database 240. The controller 230 may determine the state of the gearbox components based on the heat signature of the gearbox components received from the thermal imaging device 215. The controller 230 may compare the heat signature of the gearbox components to a threshold or to heat signature data stored in the database 240 to determine failure of the gearbox components. When the gearbox components have failed (that is, reached the threshold state for maintenance), the controller 230 may generate an alert indicating that the gearbox components need to be replaced on the mining machine. In another example, the microphone 205 may be used instead of or in addition to the thermal imaging device 215 to determine a maintenance event. The microphone 205 may capture sounds or audio data of the gearbox components. Failed gearbox components may produce excessive noise or may not generate any noise. In some embodiments, failed gearbox components may produce noise at a different frequency or amplitude. The controller 230 may determine audio signature (for example, amplitude, frequency, dispersion, and/or the like) of the gearbox components to determine whether the gearbox components have failed. The controller 230 may compare the audio signature the gearbox components with a threshold or with previously stored audio signature data to determine whether the gearbox components need to be replaced. In another example, the vibration sensor 220 may be used instead of or in addition to the thermal imaging device 215 and/or the microphone 205. The vibration sensor 220 may capture vibrations of the gearbox components. Failed gearbox components may produce excessive vibrations or vibrations of a particular frequency and/or amplitude. The controller 230 may determine vibration signature (for example, amplitude, frequency, dispersion, and/or the like) of the gearbox components to determine whether the gearbox components have failed. The controller 230 may compare the vibration signature the gearbox components with a threshold or with previously stored vibration signature data to determine whether the gearbox components need to be replaced.

In another aspect, the method 500 may be used to identify failing or overworked motors of mining machines. The monitoring vehicle 110 may navigate around a predetermined path to a mining machine (for example, a longwall shearer). One or more sensors 185 may be used to capture data relating to a motor of the mining machine. In one example, the thermal imaging device 215 may be used to capture the heat signature of a motor of the mining machine. The heat signature of functioning motors of the mining machine during or after operation may have been previously acquired and stored in the database 240. The controller 230 may determine the state of the motor based on the heat signature of the motor received from the thermal imaging device 215. The controller 230 may compare the heat signature of the motor to heat signature data stored in the database 240 to determine failure of the motor. When the motor is failing (that is, reached the threshold state for maintenance), the controller 230 may generate an alert indicating that the motor needs to be replaced on the mining machine. In another example, the microphone 205 may be used instead of or in addition to the thermal imaging device 215 to determine a maintenance event. The microphone 205 captures sounds or audio data of the motor. Failing motors may produce excessive noise or produce noise at a different frequency or amplitude. The controller 230 may determine audio signature (for example, amplitude, frequency, dispersion, and/or the like) of the motor to determine whether the motor is failing. The controller 230 may compare the audio signature the motor with a threshold or with previously stored audio signature data to determine whether the motor needs to be replaced.

The controller 230 may determine a maintenance event in the equipment 130 and alert the operator of the maintenance event when one of the sensors 185 (for example, the microphones 205, the imaging devices 210, the thermal imaging device 215, or the vibrations sensors 220) detect the maintenance event, and the others do not detect the maintenance event. Alternatively, the controller 230 may only determine the maintenance event in the equipment 130 when two or more sensors 185 detect the maintenance event (for example, the microphones 205 and the imaging device 210, the thermal imaging device 215 and the imaging device 210, etc.).

Once a maintenance event in the equipment 130 is detected and the operator is alerted, the operator may choose a response method via the remote monitoring server 120. The operator may ignore the maintenance alert and may have the mining operation continue as usual. The operator may remotely turn off the equipment 130 or the operator may send a worker to the equipment 130 to perform maintenance on the equipment 130. Alternatively, the operator may instruct the monitoring vehicle 110, for example, using the remote monitoring server 120, to perform basic maintenance tasks related to the maintenance event or wear of the equipment 130. For example, the monitoring vehicle 110 may be able to change the cutting picks 175 on the equipment 130. The monitoring vehicle 110 may also be able to move the cables 180. The operator may instruct the monitoring vehicle 110 to perform the tasks immediately, or the operator may schedule the tasks in the predetermined travel plan so that they can be performed at a later time and/or date.

Figure 6:
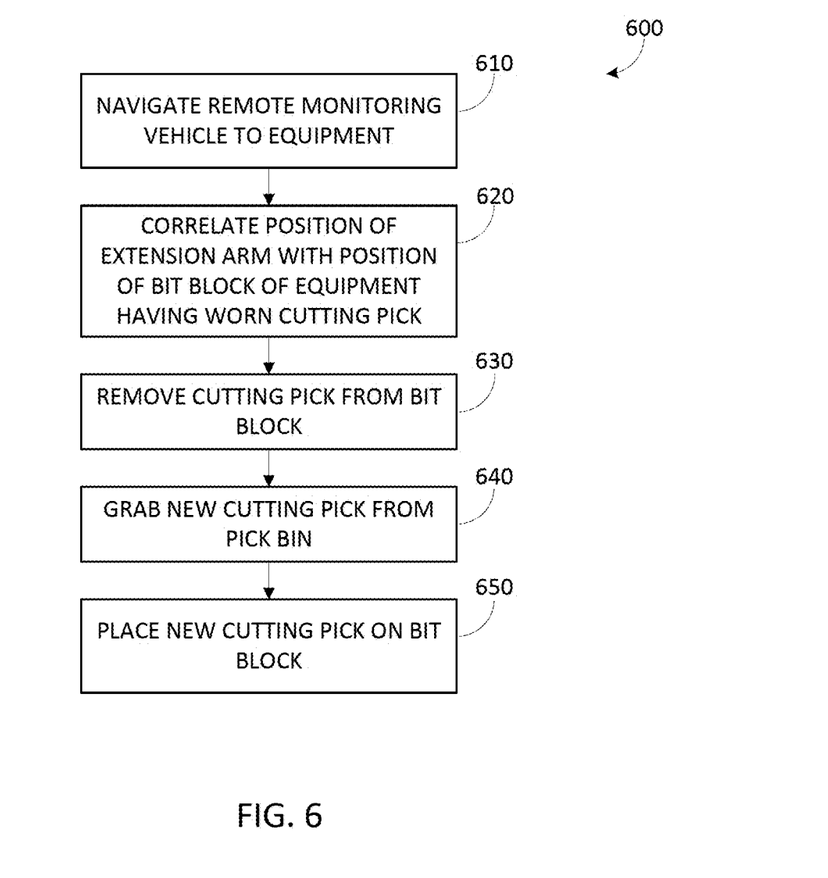
FIG. 6 illustrates a flowchart of a method for performing a maintenance action using the monitoring vehicle of FIG. 1 in accordance with some embodiments.

FIG. 6 illustrates a flowchart of one example method 600 for performing a maintenance action using the monitoring vehicle 110. The maintenance action may include replacing worn cutting picks 175 of a cutting machine (that is, the equipment 130).

At step 610, the method 600 may include navigating, using the controller 230, the monitoring vehicle 110 to the equipment 130. The controller 230 may navigate to the monitoring vehicle 110 along a predetermined path to the equipment 130 in response to receiving an instruction to replace a particular cutting pick 175. For example, an operator may instruct the monitoring vehicle 110 and the controller 230 using the remote monitoring server 120 after the operator has been alerted that there is a need to replace a cutting pick 175.

At step 620, the method 600 may include correlating, using the controller 230, a position of the extension arm 190 with a position of a bit block of the equipment 130 having the worn cutting pick 175. The monitoring vehicle 110 may store drum indexing logic (for example, a look-up table) that may correlate a position of the extension arm 190 or the attachment 225 (for example, a pick removing tool) with the position of each of the bit blocks of the cutting machine including the cutting picks 175. The controller 230 may move the extension arm 190 into the correct position and location determined by the drum indexing logic. The controller 230 may move the extension arm 190 such that the attachment 225 may engage with the cutting pick 175 that needs to be replaced.

At step 630, the method 600 may include removing, using the extension arm 190, the cutting pick 175 from the bit block. The attachment 225 may include a pick removing tool that grasps the cutting pick 175 and removes the cutting pick 175 from the bit block of the cutting drum 165, 170. For example, the attachment 225 may twist to unscrew the cutting pick 175 from the equipment 130. Alternatively, the attachment 225 may pull on the cutting picks 175 to release the cutting picks 175 from the equipment 130. The controller 230 may deactivate an electric lock or the attachment 225 may deactivate a mechanical lock that prevents the cutting pick 175 from being accidentally removed before removing the cutting pick 175.

At step 640, the method 600 may include grabbing, using the extension arm 190, a new cutting pick 175 from the pick bin 195. The controller 230 may control the extension arm 190 and the attachment 225 (for example, a pick removing tool) to drop the dull cutting pick 175 into a first section of the pick bin 195. The controller 230 may control the extension arm 190 and the attachment 225 (for example, a grabber tool) to select a new cutting pick 175 from a second section of the pick bin 195. The pick bin 195 may be disposed on the housing of the monitoring vehicle 110 or, in another embodiment, the pick bin 195 may be separate from the monitoring vehicle 110.

At step 650, the method 600 may include placing, using the extension arm 190, the new cutting pick 175 on the bit block. The controller 230 may use the drum indexing logic to move the extension arm 190 back into the location of the bit block. The extension arm 190 and the attachment 225 may twist to screw the cutting pick 175 into the bit block of the cutting drum 165, 170. Alternatively, the attachment 225 may push on the cutting pick 175 to secure the cutting pick 175 to the equipment 130. The controller 230 may activate an electric lock or the attachment 225 may activate a mechanical lock that prevents the cutting pick 175 from being accidently removed after the new cutting pick 175 is places.

Although the method 600 is described including an extension arm 190 and an attachment 225 performing several actions, it should be noted that multiple extension arms 190 and multiple attachments 225 performing the described actions is within the scope of the method 600. For example, a first extension arm 190 including a pick removing tool attachment 225 may remove the worn cutting pick 175 while a second extension arm 190 including a grabber attachment 225 may place the new cutting pick 175. In this example, the first extension arm 190 and the second extension arm 190 may collectively be referred to as the extension arm 190 and the pick removing tool attachment 225 and the grabber attachment 225 may collectively be referred to as the attachment 225.

Figure 7:
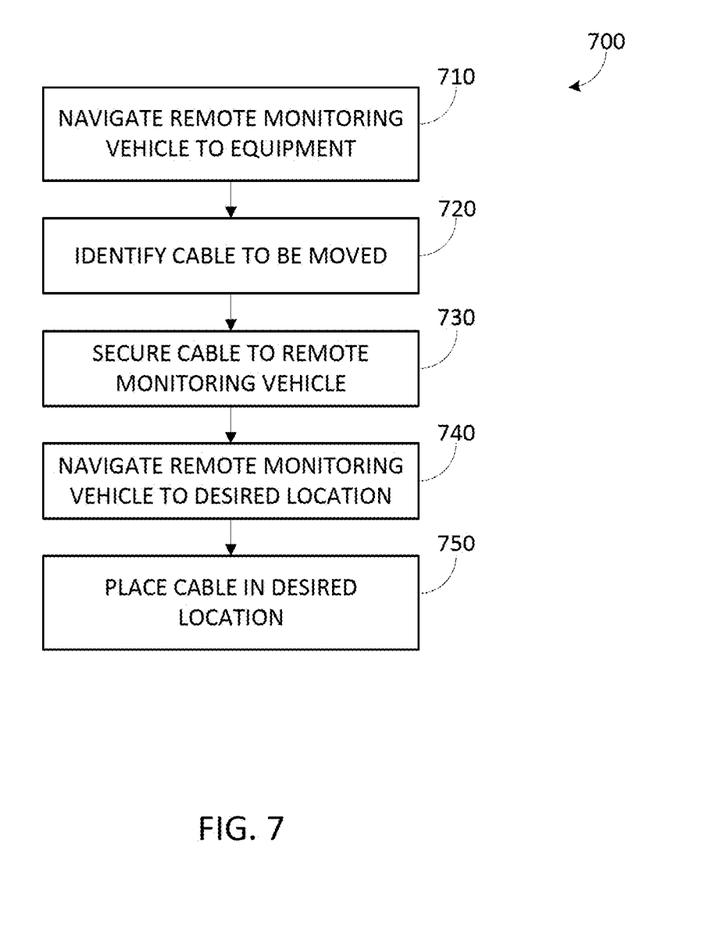
FIG. 7 illustrates a flowchart of a method for performing a maintenance action using the monitoring vehicle of FIG. 1 in accordance with some embodiments.

FIG. 7 illustrates a flowchart of one example method 700 for performing a maintenance action using the monitoring vehicle 110. The maintenance action may include moving cables 180 of a mining machine (that is, the equipment 130). In the example illustrated, at step 710, the method 700 may include navigating, using the controller 230, the monitoring vehicle 110 to the equipment 130. The controller 230 may navigate to the monitoring vehicle 110 along a predetermined path to the equipment 130 in response to receiving an instruction to move the cables 180. For example, an operator may instruct the monitoring vehicle 110 and the controller 230 using the remote monitoring server 120 after the operator has been alerted that the cables 180 may be in an unsafe location.

At step 720, the method 700 may include identifying, using the controller 230, a cable 180 to be moved. The cables 180 may be identified using one or more of the sensors 185. In one example, the imaging device 210 may be used to identify the cables 180. The controller 230 may capture an image of the cable 180 using the imaging device 210 and identify the cable 180 based on the image. In some aspects, indicia (e.g., bar codes, identification numbers, or the like) may be printed on or attached to the cables 180, which may be identified by the controller 230 in the image captured by the imaging device 210. In other aspects, the cables 180 may be identified using different techniques (for example, using an RFID chip and reader).

At step 730, the method 700 may include securing, using the extension arm 190, the cable 180 to the monitoring vehicle 110. The extension arm 190 may include the attachment 225 (for example, a grabber tool) configured to grab the cable 180. Alternatively, the cable 180 may include cable attachment members that the attachment 225 engages with. The attachment 225 may secure the cable 180 to the monitoring vehicle 110 such that when the monitoring vehicle 110 moves, the cable 180 moves with the monitoring vehicle 110.

At step 740, the method 700 may include navigating, using the controller 230, the monitoring vehicle 110 to a desired location. In some embodiments, the desired location may be provided by an operator. In other embodiments, the desired location may be automatically detected by the monitoring vehicle 110 using the imaging device 210. The desired location may be a location where the cables 180 do not pose a hazard. The controller 230 may control the drive mechanism 200 to move the monitoring vehicle 110 to the desired location.

At step 750, the method 700 may include placing, using the extension arm 190, the cable 180 in the desired location. The controller 230 may control the extension arm 190 and the attachment 225 to release the cable 180.

Specific embodiments of systems and methods for monitoring mining equipment generating alerts based on detected wear or failure, and performing maintenance actions according to this disclosure have been described for the purpose of illustrating the manner in which the disclosure can be made and used. It should be understood that the implementation of other variations and modifications of this disclosure and its different aspects will be apparent to one skilled in the art, and that this disclosure is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:

1. A remote monitoring vehicle for an industrial site comprising:
   one or more sensors;
   a drive mechanism for driving the remote monitoring vehicle;
   a first extension arm coupled to a first attachment; and
   a controller coupled to the one or more sensors, the drive mechanism, and the first extension arm; the controller is configured to:
   navigate, using the drive mechanism, the remote monitoring vehicle along a predetermined path of the industrial site;
   receive, from the one or more sensors, sensor data relating to a component of mining equipment;
   determine a state of the component based on the sensor data;
   determine whether the state of the equipment component meets a threshold state for maintenance;
   generate an alert indicating a maintenance event for the mining equipment when the state of the component meets the threshold state for maintenance; and
   remove the component using the first extension arm when the state of the component meets the threshold state for maintenance.

2. The remote monitoring vehicle of claim 1 further comprising a second extension arm coupled to the controller, wherein the second extension arm is further coupled to a second attachment.

3. The remote monitoring vehicle of claim 2, wherein the first attachment is different from the second attachment.

4. The remote monitoring vehicle of claim 2, wherein the first attachment and the second are each selected from a group including a pick removing tool and a grabber assembly.

5. The remote monitoring vehicle of claim 1, wherein the drive mechanism includes one or more propellers.

6. The remote monitoring vehicle of claim 1, wherein the one or more sensors are each selected from a grouping including a microphone, an imaging device, a thermal imaging device, and a vibration sensor.

7. The remote monitoring vehicle of claim 1 further comprising a pick bin, wherein the pick bin is provided within a proximity of the first extension arm such that the first extension arm can access a content of the pick bin.

8. The remote monitoring vehicle of claim 7, wherein the controller is further configured to:
   correlate a position of the first extension arm with a position of a bit block of the mining equipment having a worn cutting pick;
   remove, using the first extension arm, the worn cutting pick from the bit block;
   grab, using the first extension arm, a new cutting pick from the pick bin; and
   place, using the first extension arm, the new cutting pick on the bit block.

9. The remote monitoring vehicle of claim 1, wherein the controller is further configured to:
   identify a cable of the mining equipment to be moved;
   secure, using the first extension arm, the cable to the remote monitoring vehicle;
   navigate, using the drive mechanism, the remote monitoring vehicle to a desired location; and place, using the first extension arm, the cable at the desired location.

10. A method for offboard monitoring of an industrial site using a remote monitoring vehicle having a first extension arm coupled to a first attachment, the method comprising:
navigating, using a controller, a remote monitoring vehicle along a predetermined path of the industrial site;
receiving, using the controller, sensor data relating to a component of mining equipment from one or more sensors of the remote monitoring vehicle;
determining, using the controller, a state of the component based on the sensor data;
determining, using the controller, whether the state of the component meets a threshold state for maintenance;
generating, using the controller, an alert indicating a maintenance event for the mining equipment when the state of the component meets the threshold state for maintenance; and
removing the component using the first extension arm when the state of the component meets the threshold state for maintenance.

11. The method of claim 10 further comprising:
correlating, using the controller, a position of an extension arm of the remote monitoring vehicle with a position of a bit block of the mining equipment having a worn cutting pick;
removing, using the extension arm of the remote monitoring vehicle, the worn cutting pick from the bit block;
grabbing, using the extension arm, a new cutting pick from a pick bin; and
placing, using the extension arm, the new cutting pick on the bit block.

12. The method of claim 10 further comprising:
identifying, using the controller, a cable of the mining equipment to be moved;
securing, using an extension arm of the remote monitoring vehicle, the cable to the remote monitoring vehicle;
navigating, using the controller, the remote monitoring vehicle to a desired location; and
placing, using the extension arm, the cable at the desired location.

13. The method of claim 10, wherein the receiving, using the controller, the sensor data relating to the mining equipment further comprises receiving sensor data from different types of sensors.

14. The method of claim 10, wherein the receiving sensor data relating to an equipment comprises receiving a first sensor data from a first sensor of the remote monitoring vehicle and a second sensor data from a second sensor of the remote monitoring vehicle,
wherein the determining the state of the mining equipment comprises determining a first state of the mining equipment based on the first sensor data and determining a second state of the mining equipment based on the second sensor data,
determining whether the state of the mining equipment meets the threshold state for maintenance comprises determining whether the first state of the mining equipment meets a first threshold state for maintenance and whether the second state of the mining equipment meets a second threshold state for maintenance, and
wherein the first sensor is a different type of sensor than the second sensor.

15. The method of claim 14, wherein the generating the alert indicating the maintenance event for the mining equipment comprises only generating the alert when both the first state of the mining equipment meets the first threshold state for maintenance and the second state of the mining equipment meets the second threshold state for maintenance.

16. A system for remote monitoring for an industrial site comprising:
a mining equipment; and
a remote monitoring vehicle for monitoring the mining equipment, the remote monitoring vehicle comprising:
one or more sensors;
a drive mechanism for driving the remote monitoring vehicle;
a first extension arm coupled to a first attachment; and
a controller coupled to the one or more sensors the drive mechanism, and the first extension arm; the controller is configured to:
navigate, using the drive mechanism, the remote monitoring vehicle along a predetermined path of the industrial site;
receive, from the one or more sensors, sensor data relating to a component of the mining equipment;
determine a state of the component based on the sensor data;
determine whether the state of the component meets a threshold state for maintenance;
generate an alert indicating a maintenance event for the mining equipment when the state of the component meets the threshold state for maintenance;
secure, using the first extension arm, the component to the remote monitoring vehicle;
navigate, using the drive mechanism, the remote monitoring vehicle to a desired location; and
place, using the first extension arm, the component at the desired location.

17. The system of claim 16, wherein the remote monitoring vehicle further comprising a second extension arm coupled to the controller, wherein the second extension arm is further coupled to a second attachment.

18. The system of claim 17, wherein the first attachment is different from the second attachment.

19. The system of claim 17, wherein the first attachment and the second are each selected from a group including a pick removing tool and a grabber assembly.

20. The system of claim 16, wherein the drive mechanism includes one or more propellers.

21. The system of claim 16, wherein the one or more sensors are each selected from a group including a microphone, an imaging device, a thermal imaging device, and a vibration sensor.

22. The system of claim 16, wherein the remote monitoring vehicle further comprising a pick bin, wherein the pick bin is provided within a proximity of the first extension arm such that the first extension arm can access a content of the pick bin.

* * * * *